United States Patent [19]
Engler et al.

[11] Patent Number: 5,144,611
[45] Date of Patent: Sep. 1, 1992

[54] OPTICAL DISK DRIVE CLEANER CARTRIDGE

[75] Inventors: Edward M. Engler, San Jose, Calif.; Timothy S. Gardner; David P. McReynolds, Tuscon, both of Ariz.; Stephen M. Ward, Richfield, Conn.

[73] Assignee: International Business Machines Corporation, Armonk, N.Y.

[21] Appl. No.: 591,158

[22] Filed: Oct. 1, 1990

[51] Int. Cl.⁵ .......................... G11B 3/58; G11B 5/02
[52] U.S. Cl. ....................................... 369/71; 369/292
[58] Field of Search ........................ 369/71, 72, 73, 74; 360/128

[56] References Cited

U.S. PATENT DOCUMENTS

| | | | |
|---|---|---|---|
| 4,065,798 | 12/1977 | Sugisaki et al. | 360/128 |
| 4,489,356 | 12/1984 | Farmer | 369/72 |
| 4,503,473 | 3/1985 | Eyler et al. | 360/128 |
| 4,558,386 | 12/1985 | Uara | 360/128 |
| 4,581,668 | 4/1986 | Campbell | 369/72 |
| 4,639,813 | 1/1987 | Uno | 360/128 |
| 4,662,617 | 11/1986 | Fritsch | 360/128 |
| 4,663,686 | 5/1987 | Freeman et al. | 360/128 |
| 4,682,257 | 7/1987 | Neuman | 360/128 |
| 4,817,078 | 3/1989 | Iwata | 369/71 |
| 4,870,636 | 9/1989 | Yamamoto | 369/292 |

FOREIGN PATENT DOCUMENTS

| | | | |
|---|---|---|---|
| 0127540 | 7/1985 | Japan | 369/72 |
| 209084 | 2/1987 | Japan | |
| 121171 | 12/1987 | Japan | |
| 0078390 | 4/1988 | Japan | 369/72 |
| 249284 | 8/1988 | Japan | |
| 244467 | 10/1988 | Japan | |
| 185840 | 7/1989 | Japan | |
| 168481 | 8/1989 | Japan | |
| 251482 | 10/1989 | Japan | |
| 0042638 | 2/1990 | Japan | 369/71 |

OTHER PUBLICATIONS

"Air—Jet Diskette Cleaner" D. S. Tollefson, IBM Technical Disclosure Bulletin, vol. 26, No. 3A, Aug. 1983.

*Primary Examiner*—Stuart S. Levy
*Assistant Examiner*—Tan Nguyen
*Attorney, Agent, or Firm*—M. W. Schecter

[57] ABSTRACT

The invention is a cleaning cartridge which includes a housing and a tube for injecting a compressed gas therethrough and into specific areas of an optical disk drive. The tube is removably connectable at one end to a compressed gas supply, and is aimed at the other end to direct gas exiting therefrom at both the objective lens, beam-directing prism or mirror, or other internal optical disk drive components when the cartridge is seated in the drive. Upon insertion of the cleaning cartridge into the optical disk drive in the usual manner for any optical disk cartridge, gas is released from the compressed gas source, through the tube, and into the optical disk drive. The use of such a cleaning cartridge provides for easy, effective cleaning of any internal optical disk drive component without the abrasion and potential inconveniences associated with mechanical brushing, wiping, or other techniques.

2 Claims, 2 Drawing Sheets

OPTICAL DISK DRIVE CLEANER CARTRIDGE

BACKGROUND OF THE INVENTION

1. Field of the Invention

This invention relates to a cleaner device for a peripheral storage device. More particularly, the invention relates to a cleaner cartridge allowing for the use of a compressed gas to clean the objective lens and other internal optical and mechanical components of an optical disk drive.

2. Description of the Related Art

Data processing systems require means for storing user data and instructions for manipulating such user data. One type of storage is main memory, which typically includes one or more integrated circuit microchips. Although the cost per unit of storage in the form of microchips has been trending downward, it is nevertheless expensive to use main memory as the exclusive form of storage. Thus, peripheral storage devices are also used.

The most common peripheral storage devices are magnetic recording units, such as magnetic tape drives and magnetic direct access storage devices (DASDs), and optical disk drives. These devices require mechanical motion to store and retrieve data. Mechanical motion is required to position a specific, desired portion of a tape or disk adjacent to a transducing head. The requirement for mechanical motion prevents peripheral storage devices from operating at the purely electronic speeds of main memory. However, because peripheral storage devices can store information more cheaply than main memory, such devices are nevertheless used to store certain less infrequently accessed information.

Peripheral storage devices are susceptible to contamination problems. Contamination results from several primary sources. First, contamination results from the removable nature of most peripheral storage media. Magnetic floppy disks, magnetic tapes, and optical disks are generally removable from their associated drives in the form of a cartridge and collect dust, dirt, vapor residues, and other miscellaneous forms of contaminants while exposed to the normal room environment. Upon the insertion of a cartridge into a drive, some of these contaminants may be transferred to the internal drive components. In addition, the cartridge access door in a drive (for the insertion and removal of storage media cartridges) allows for airborne contaminants to penetrate therein.

Another source of contamination is the contact made between moving parts of the drive, and between parts of the drive and the storage media. In magnetic tape drives, the tape contacts the tape head and other tape path components, creating particulates as the tape wears. The same is true for magnetic disks and heads in magnetic disk drives. All magnetic and optical drives include moving parts for the relative positioning of a storage medium and a transducing head. The mechanical action of and between these parts generates particulates. An additional source of contamination is airborne particulates, which may enter a drive via the cartridge access door, or by fan-forced air flow used for the cooling of system components.

Contaminants result in the degradation of performance of peripheral storage devices. In magnetic tape drives, contaminants can abrade the head and tape, decreasing the effectiveness. Also, contaminants can separate the tape and head, resulting in magnetic dropout (signal loss). The same is true for magnetic disk drives, in which the crash of a head into a simple dust particle can result in catastrophic failure of the drive. Optical disk drives are different from magnetic drives in that various contamination sensitive components of the optical beam path are not located immediately adjacent to the storage media. Optical disk drives have a mode of susceptibility to contaminants in addition to those of magnetic drives - contaminants disrupting a portion of the optical beam path can also have a negative impact on performance. For example, the scattering, deflection, or blockage of the optical beam can prevent accurate reading and writing of data.

Just as different contamination problems are associated with each type of peripheral storage device, there are cleaning techniques having various levels of effectiveness, some associated with a specific type of peripheral storage device. Several techniques are known for removing contaminants from the internal components of a peripheral storage device. One technique is to remove the outside housing of the drive to gain access to and clean all contaminated internal drive components. However, this technique is timely, and generally requires the assistance of a trained technician to properly disassemble the drive, clean the appropriate components, and reassemble the drive. Another technique is the use of mechanical brushing or wiping action through the cartridge access door of a drive. Such mechanical action is provided manually by operator insertion of a cotton swab through the cartridge access door of the drive. This technique is not preferred because the access door does not usually provide adequate access to all of the internal drive components requiring periodic cleaning. In cases where adequate access is provided, such access is nevertheless awkward, difficult for the operator to perform, or risks damage to the internal components of the device.

Another technique for cleaning the internal components of a peripheral storage device is the mounting of a brush, pad or similar device for contact cleaning on or in a cartridge housing. The brush is brought into contact with the components to be cleaned, usually the transducing head, during or after insertion of the cleaning cartridge into the drive. A brush mounted on a cartridge may be swept across a component as the cartridge is inserted into the drive and finally positioned relative to a magnetic or optical transducing head. Examples of such a cartridge for cleaning an objective lens in an optical disk drive are disclosed in U.S. Pat. No. 4,870,636 and Japanese published unexamined patent applications 63-244467, 02-49284, and 02-168481. A brush mounted in a cartridge is swept across a component after the cartridge is finally positioned relative to the transducing head. In magnetic tape drives, it is well known to use a cartridge having a special cleaner tape therein replacing the magnetic recording tape. The cleaner tape contacts the magnetic tape head(s) and tape bearing surfaces of the cleaner tape just as the recording tape would. The material used to manufacture the cleaner tape is designed to remove contaminants from the surfaces with which it makes contact. In disk drives, it is similarly known to use a cartridge having a special disk therein to clean a magnetic head or optical beam path objective lens. Examples of such a cartridge for cleaning a magnetic disk head in a magnetic disk drive are disclosed in U.S. Pat. Nos. 4,065,798, 4,503,473, and 4,663,686 and examples of such a cartridge for cleaning the objective lens of an optical disk drive are disclosed in U.S. Pat. No. 4,817,078 and Japanese published unexamined patent applications 63-209084 and 01-251482.

The aforementioned use of a brush or pad mounted on or in a cartridge is not optimal for cleaning optical disk drives. Because the objective lens of an optical disk drive is located relatively near to a cartridge therein (although still much farther than a magnetic head is, if at all, from a magnetic disk or tape cartridge), such a brush may be used to clean the objective lens. However, the remaining optical components of an optical disk drive cannot be so cleaned. Other lenses, mirrors, prisms, and detectors may be used in the optical beam path for focussing and/or tracking and are located further from the cartridge than the objective lens. There is no known technique for providing mechanical brushing or wiping of such internal components using a simple cleaning cartridge. Also, such mechanical action is not desired as these optical components tend to be more susceptible to degradation from scratching or brush streaks than magnetic heads.

Any of the aforementioned mechanical brushing or wiping techniques may be combined with the use of cleaning liquids applied to the brushes or pads of the cleaning device. Examples of the use of such cleaning liquids are disclosed in U.S. Pat. Nos. 4,558,386, 4,622,617, and 4,682,257. For optical disk drives, these combined cleaning techniques still suffer from those previously described drawbacks associated with mechanical action. To eliminate the abrasion caused by the mechanical brushing action itself, cleaning liquids may be used apart from such contact cleaning techniques. For example, U.S. Pat. No. 4,639,813 discloses a cleaning cartridge for a magnetic disk drive which allows for a cleaning liquid to be injected into the drive. Although mechanical abrasion is eliminated, it is difficult to ensure that the desired components are sprayed with the cleaning liquid, and that other components sensitive to moisture are not so sprayed.

Another non-contact technique for cleaning peripheral storage devices is the use of air flow. One technique is to manually insert a tube through the cartridge access door of the drive. The end of the tube outside of the drive is connected to a source of compressed gas, such as an aerosol can, and the end of the tube inside of the drive is aimed to direct the gas exiting therefrom at the internal drive component for which cleaning is desired. This technique suffers from the same disadvantages as those associated with the aforementioned manual mechanical brushing or wiping techniques. In another technique, a fan is mounted inside the drive and used to blow or pull air across the internal components of the drive. An example of fan-driven air flow to clean a magnetic disk drive is disclosed in Tollefson, Air-Jet Diskette Cleaner, IBM Technical Disclosure Bulletin, Vol. 26, No. 3A, August, 1983, pp. 1007-08 and an example of such in an optical disk drive is disclosed in Japanese published unexamined patent application 01-185840. Although such air flow has some potential benefit, it is inadequate in that it cannot be directed at specific drive component(s). Furthermore, the size and power constraints of the drive limit the air velocity which can be generated by the fan, thereby inhibiting cleaning ability. Finally, unless the air is adequately filtered, it may cause more contamination than it eliminates.

As the storage density of peripheral storage devices increases, the amount of contamination required to result in a negative impact on the performance of a peripheral storage device decreases. For example, the cross-section of the focussed spot in an optical disk drive determines the size of a recorded data bit. As the cross-section of the collimated optical beam is reduced, the size of a particulate required to fully block the beam and prevent read/write operations is thus also reduced. A heretofore unrecognized problem is how to clean a plurality of the internal components of a peripheral storage device without the drawbacks of the aforementioned cleaning techniques.

SUMMARY OF THE INVENTION

In view of the foregoing, it is the principal object of this invention to improve the cleaning of peripheral storage devices.

Another object of this invention is to improve the cleaning of optical disk drives.

Still another object of this invention is to provide for simple, effective cleaning of the objective lens and other internal optical and mechanical components of optical disk drives.

These and other objects of this invention are accomplished by a cleaning cartridge which includes a housing and a tube for injecting a compressed gas therethrough and into specific areas of an optical disk drive. The tube is removably connectable at one end to a compressed gas supply, and is aimed at the other end to direct gas exiting therefrom at both the objective lens, beam-directing prism or mirror, or other internal optical disk drive components when the cartridge is seated in the drive. Upon insertion of the cleaning cartridge into the optical disk drive in the usual manner for any optical disk cartridge, gas is released from the compressed gas source, through the tube, and into the optical disk drive. The use of such a cleaning cartridge provides for easy, effective cleaning of any internal optical disk drive component without the abrasion and potential inconveniences associated with mechanical brushing, wiping, or other techniques.

The foregoing and other objects, features, and advantages of the invention will be apparent from the following more particular description of the preferred embodiments of the invention, as illustrated in the accompanying drawing.

DESCRIPTION OF THE PREFERRED EMBODIMENT

Figure 1:
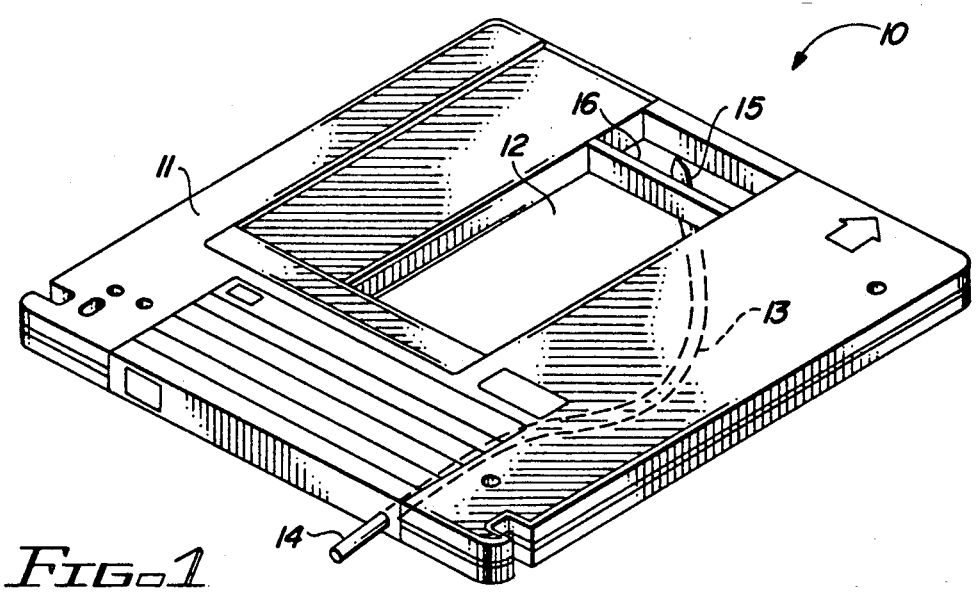
FIG. 1 is a perspective view of a cleaner cartridge according to one embodiment of the invention.

Referring now more particularly to the drawing, like numerals denote like features and structural elements in the various figures. The invention will be described as practiced in an optical disk drive. More particularly, the invention will be described as practiced in an optical disk drive having a fixed optical transducing head and one or more movable actuators including a beam directing prism. It will be understood that the invention is also applicable to other types of peripheral storage devices, including optical disk drives having a movable optical head, or a fixed optical head and movable fine actuator including a beam directing mirror.

Referring to FIG. 1 the cleaner cartridge of the preferred embodiment of the invention will now be described. The cleaner cartridge 10 includes a housing 11. A "housing" is a substantially box-like frame which can be either hollow or solid, except as described herein. Housing 11 is injection molded or otherwise shaped in the form of an optical disk cartridge and is manufactured from a plastic such as polycarbonate. The shape of housing 11 can be any such shape which is suitable for insertion into an optical disk drive, such that the optical disk drive will accept the cartridge and seat it properly therein, as for any optical disk cartridge compatible therewith. In the preferred embodiment, housing 11 is manufactured and shaped according to International Standards Organization (ISO) standard number DIS 10089. As shown in FIG. 1, a shutter for cartridge 10 has been removed for simplicity, and to show an opening 12 in housing 11. If housing 11 were used to house an optical disk, opening 12 would be used to expose the optical disk to the internal components of an optical disk drive. Here, opening 12 serves a different purpose, as will be described.

Cleaner cartridge 10 also includes a tube 13 running through housing 11. Tube 13 may be manufactured from any airtight material such as steel or polyvinyl plastics. One end of the tube, end 14, extends through a hole drilled or molded into housing 11. An opposite end of tube 13, end 15, extends through a different hole in housing 11 into and through opening 12. A support rod 16 is used to position and properly aim end 15 of tube 13. Tube 13 is fixed in place in housing 11 with a suitable adhesive such as an epoxy resin. The use of cleaner cartridge 10 will be apparent from the teaching herein.

Figure 2:
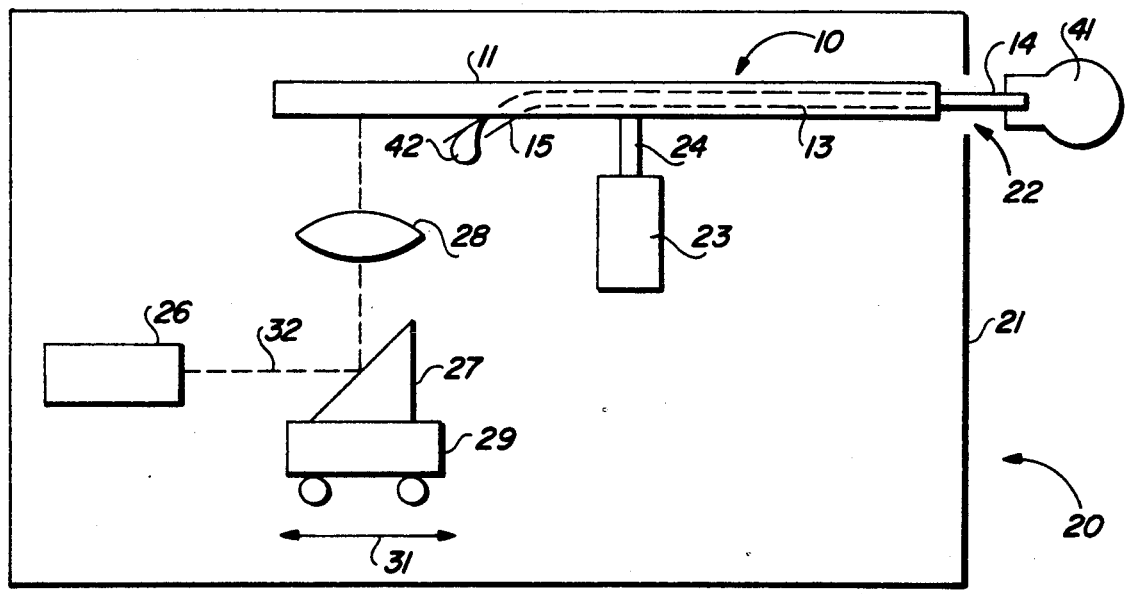
FIG. 2 is a schematic of an optical disk drive according to the embodiment of the invention shown in FIG. 1.

Referring to FIG. 2, the use of cleaner cartridge 10 as seated in an optical disk drive 20 will now be described. The housing 11 and tube 13 of cleaner cartridge 10 is shown seated in optical disk drive 20 as would be any optical disk cartridge compatible therewith. Cleaner cartridge 10 is seated in optical disk drive 20 by manual or robotic insertion through cartridge access opening 22. For purposes of simplicity, the cartridge access door, if any, is not shown in FIG. 2. Also contained within housing 21 of optical disk drive 20 is motor 23 from which spindle 24 extends. Normally, for optical disk cartridges, spindle 24 mates with the hub of the optical disk therein and is rotatably driven by motor 23.

The internal optical beam path elements of optical disk drive 20 include an optical transducing head and a coarse actuator. The optical head 26 may include therein a laser or other optical beam source, optical detectors, and various other optical elements as is known in the art. The coarse actuator includes two basic optical components, the beam directing prism 27 and the objective lens 28. Although not shown in FIG. 2 for simplicity, prism 27 and lens 28 are both mounted on carriage 29 for movement in the direction of double arrow 31. Such movement allows for coarse positioning of the optical beam emitted from optical head 26 and redirected by beam directing prism 27 onto a particular specified set of tracks or area of an optical disk mounted on spindle 24. The mounting of prism 27 and lens 28 on carriage 29 to allow for proper tracking and focussing of the optical beam is well known in the art. The optical beam path is represented in FIG. 2 by dotted line 32. Prism 27 is referred to as "beam directing" because it changes the path of the optical beam. Other optical components, such as mirrors, could also be used as beam directing components.

Still referring to FIG. 2, a rubber squeeze bulb 41 is attached at end 14 of tube 13. Squeeze bulb 41 may be manually squeezed or compressed to inject gas through tube 13. In alternative embodiments, squeeze bulb 41 may be replaced by a flexible polyethylene squeeze bottle, an aerosol type gas canister, or a compressed gas cylinder. If a squeeze bulb or bottle is used, the shape may be changed from that shown. For example, a wide, oval squeeze bottle might facilitate easier manual compression. Also, a rigid adapter may be used to connect the gas source to end 14 of tube 13. The source gas may be any dry, inert gas. The gas directed through tube 13 exits at end 15 thereof and is directed towards specific internal components of optical disk drive 20 by an epoxy bead deflector 42.

Figure 3:
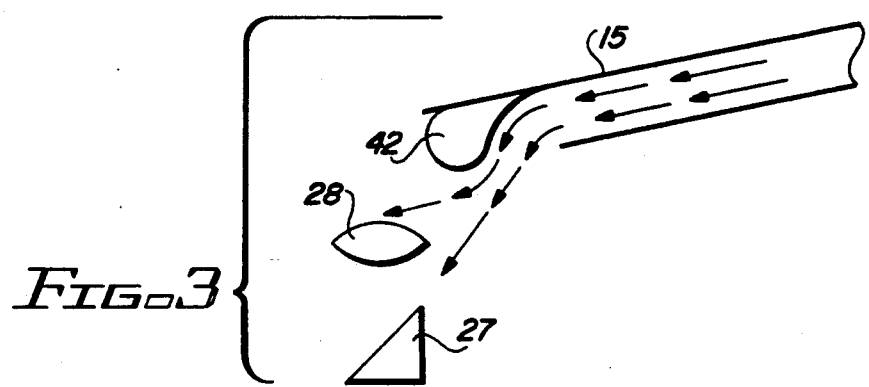
FIG. 3 is a magnified, cross-sectional view of the end of the cleaner cartridge tube of FIGS. 1-2 in the proximity of the objective lens and beam directing prism of the optical disk drive.

Referring to FIG. 3, end 15 of tube 13 in proximity to prism 27 and lens 28 is enlarged. Bead 42 directs gas exiting from tube 15 at both prism 27 and lens 28. Through proper shaping of epoxy bead 42, or any other gas directing technique, the gas may be aimed at objective lens 28 and any other internal mechanical or optical component of optical disk drive 20 within reasonable proximity of end 15 of tube 13. Most importantly, end 15 of tube 13 aims the gas exiting therefrom at both beam directing prism 27 and objective lens 28 to clean both surfaces thereof.

Figure 4:
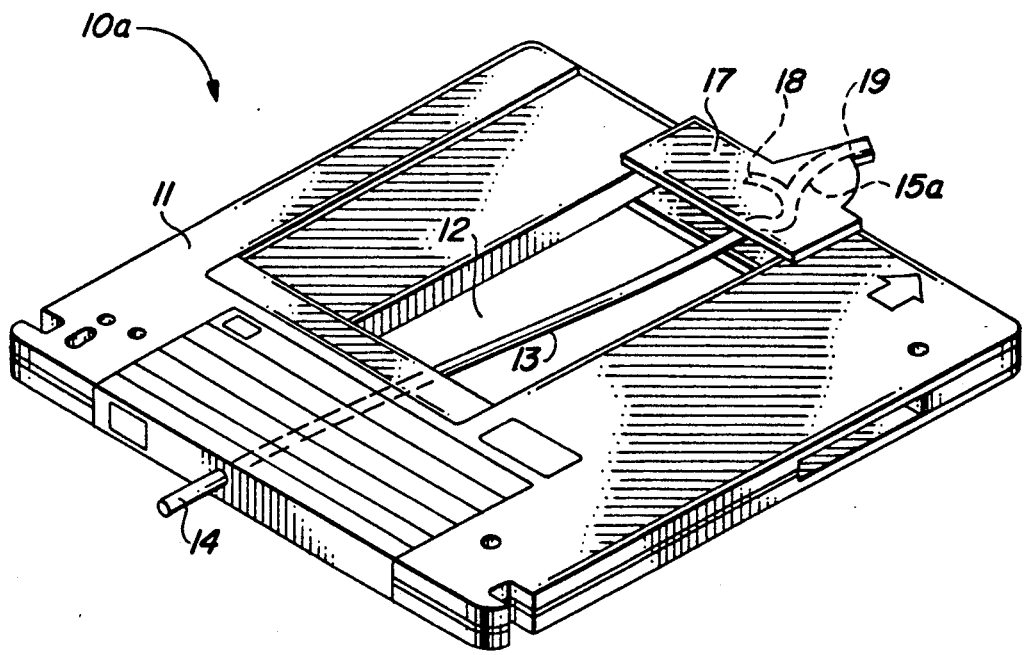
FIG. 4 is a perspective view of a cleaner cartridge according to another embodiment of the invention.

Referring to FIG. 4, an alternative cleaner cartridge 10a will now be described. Cleaner cartridge 10a is similar to cleaner cartridge 10 except that tube 13 follows a different path through cartridge 11, as shown. End 15a terminates within guide 17 and includes two exit holes 18 and 19 (not shown). Exit hole 18 aims gas from tube 13 through an opening in guide 17 at the objective lens and exit hole 19 aims gas from tube 13 through an opening in guide 17 at the beam directing prism of an optical disk drive.

Figure 5:
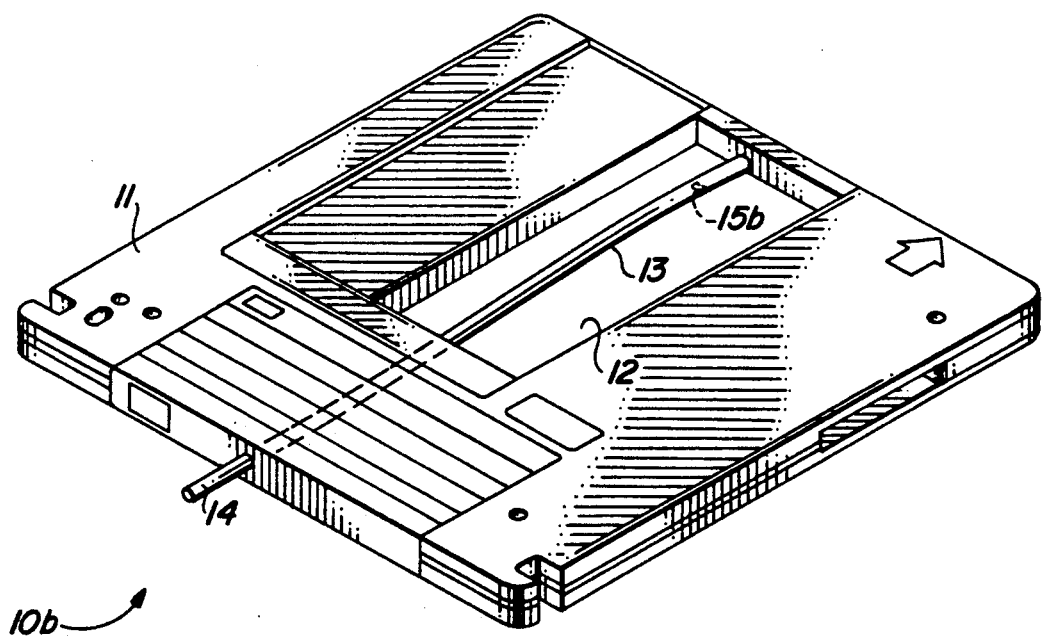
FIG. 5 is a perspective view of a cleaner cartridge according to another embodiment of the invention.

Referring to FIG. 5, an alternative cleaner cartridge 10b will now be described. Cleaner cartridge 10b is similar to cleaner cartridges 10 and 10a except that tube 13 follows a different path through cartridge 11, as shown. Gas exits from tube 13 at an opening at end 15b. Because the opening at end 15b is positioned directly over objective lens 28, the preferred applicability of cleaner cartridge 10b (as compared to the aforementioned cleaner cartridges) depends upon the specific drive configuration.

In still other alternative embodiments there can be other removable means for directing a compressed gas into an optical disk drive. In such means, for example, a tube could be mounted on the exterior (such as the side or bottom) of a cartridge housing rather than passing therethrough. Such alternative embodiments are not shown in the drawing, but are readily apparent from FIGS. 1-5. Also, depending upon the gas used, and the risk of contamination therein, a coarse, porous plug may be provided in tube 13. The porous plug would filter gas passing through tube 13 and moderate the pressure of such gas. The plug may be, for example, sintered glass or open foam.

While the invention has been described with respect to a preferred embodiment thereof, it will be understood by those skilled in the art that various changes in detail may be made therein without departing from the spirit, scope, and teaching of the invention. For example, various configurations, shapes, and materials may be used in the invention so long as they are compatible with the associated peripheral storage device. One possible alternative is to build the tube directly into the optical disk drive, one end protruding therefrom and the other end aimed at the internal components to be cleaned, rather than into or on a cleaner cartridge. Accordingly, the invention herein disclosed is to be limited only as specified in the following claims.

What is claimed is:

1. A cartridge for use in cleaning an optical disk drive comprising:
   a gas source outside of the optical disk drive;
   a housing for insertion into the optical disk drive; and
   a tube attached to the housing for directing gas from the gas source therethrough and including a bead for aiming the gas at both an objective lens and a non-focusing beam directing component of the optical disk drive when the housing is seated in the optical disk drive.

2. An optical disk drive subsystem comprising:
   an optical disk drive including means for receiving an optical disk cartridge inserted therein, an optical head, a non-focusing beam directing component and an objective lens;
   a cleaner cartridge including a housing for insertion into the optical disk drive and a tube attached to the housing for directing a gas therethrough and including a bead for aiming the gas at both the non-focusing beam directing component and the objective lens of the optical disk drive when the housing is seated in the optical disk drive; and
   a compressed gas source removably connected to the tube.

* * * * *